(12) United States Patent
Kellner et al.

(10) Patent No.: US 10,741,893 B2
(45) Date of Patent: Aug. 11, 2020

(54) MOTOR VEHICLE BATTERY

(71) Applicant: Dr. Ing. h.c. F. Porsche Aktiengesellschaft, Stuttgart (DE)

(72) Inventors: Philipp Kellner, Rennigen (DE); Jens Bohlien, Stuttgart (DE); Reyk Bienert, Eberdingen (DE); Bernd Schäfer, Stuttgart (DE); Marcus Zacher, Sindelfingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 133 days.

(21) Appl. No.: 16/170,227

(22) Filed: Oct. 25, 2018

(65) Prior Publication Data
US 2019/0173139 A1    Jun. 6, 2019

(30) Foreign Application Priority Data
Dec. 1, 2017    (DE) .................. 10 2017 128 529

(51) Int. Cl.
| | |
|---|---|
| *H01M 10/625* | (2014.01) |
| *H01M 10/613* | (2014.01) |
| *H01M 10/61* | (2014.01) |
| *H01M 10/617* | (2014.01) |
| *H01M 10/6556* | (2014.01) |
| *H01M 10/655* | (2014.01) |
| *H01M 2/10* | (2006.01) |
| *H01M 10/6554* | (2014.01) |

(52) U.S. Cl.
CPC ..... *H01M 10/6556* (2015.04); *H01M 2/1077* (2013.01); *H01M 10/613* (2015.04); *H01M 10/625* (2015.04); *H01M 10/6554* (2015.04)

(58) Field of Classification Search
None
See application file for complete search history.

(56) References Cited

U.S. PATENT DOCUMENTS

| | | |
|---|---|---|
| 9,461,285 B2 | 10/2016 | Klausmann et al. |
| 2016/0268657 A1 | 9/2016 | Park et al. |

FOREIGN PATENT DOCUMENTS

| | | |
|---|---|---|
| DE | 102012012663 A1 | 12/2013 |
| DE | 102012022765 A1 | 3/2014 |
| DE | 102013021597 A1 | 7/2014 |
| DE | 102013210932 A1 | 12/2014 |
| DE | 102014224165 A1 | 6/2016 |

(Continued)

OTHER PUBLICATIONS

English translation of DE 10-2015-115875 (Year: 2015).*

*Primary Examiner* — Yoshitoshi Takeuchi
(74) *Attorney, Agent, or Firm* — RatnerPrestia

(57) ABSTRACT

A motor vehicle battery includes a battery housing. The battery housing has a housing interior bounded in sections by a housing frame and a housing base. The motor vehicle battery further includes a plurality of battery modules arranged in the housing interior. The motor vehicle battery further includes at least one first cooling duct. The at least one first cooling duct is formed in the region of the housing base, for cooling the battery modules from a first side. The housing interior is bounded by a housing cover or by a housing lid opposite the housing base. At least one second cooling duct for cooling the battery modules from a second side is formed in the region of the housing cover or of the housing lid.

10 Claims, 3 Drawing Sheets

(56) References Cited

FOREIGN PATENT DOCUMENTS

| DE | 102015115875 A1 * | 3/2017 | .......... H01M 2/1077 |
|---|---|---|---|
| DE | 102015115875 A1 | 3/2017 | |
| DE | 102016001145 A1 | 8/2017 | |
| EP | 3157092 A1 | 4/2017 | |
| JP | 2016157578 A | 9/2016 | |

* cited by examiner

MOTOR VEHICLE BATTERY

CROSS-REFERENCE TO RELATED APPLICATION

This application claims priority to German Patent Application No. DE 10 2017 128 529.6, filed Dec. 1, 2017, the entire disclosure of which is incorporated by reference herein in its entirety.

FIELD OF THE INVENTION

The invention relates to a motor vehicle battery.

BACKGROUND OF THE INVENTION

DE 10 2015 115 875 A1, which is incorporated by reference herein, discloses a motor vehicle battery designed as a traction battery of a motor vehicle. The motor vehicle battery disclosed there comprises a battery housing, which defines a housing interior that is bounded at least in sections by a housing frame and a housing base of the battery housing. A plurality of battery modules are positioned in the housing interior of the battery housing of the motor vehicle battery. In the region of the housing base, the motor vehicle battery has at least one cooling duct in order to cool the battery modules via the housing base of the battery housing. Each battery module has a plurality of battery cells.

DE 10 2012 022 765 A1, which is incorporated by reference herein, discloses an arrangement consisting of two battery modules of a motor vehicle battery, wherein each battery module has a plurality of battery cells. The battery cells of each battery module are pressed together, wherein a cooling plate for cooling the battery cells is provided between the battery modules arranged one above another or the battery cells of the battery modules arranged one above another.

DE 10 2013 021 597 A1, which is incorporated by reference herein, discloses a further battery module of a motor vehicle battery, which has a plurality of battery cells. The battery module disclosed there has a heat removal system in order to remove heat from a housing of the battery module that accommodates the plurality of battery cells.

DE 10 2012 012 663 A1, which is incorporated by reference herein, discloses a battery module with a plurality of battery cells, which is referred to as a battery pack. The battery cells are accommodated in a housing of the battery module. The housing is assembled from a trough and a lid closing the trough. A separating body is arranged between the trough and the battery cells of the battery module. The separating body and the trough bound an intermediate space for the conduction of a coolant.

DE 10 2013 210 932 A1, which is incorporated by reference herein, discloses a further battery housing for a battery module, which has a plurality of battery cells. The housing of the battery module comprises a wall with a duct for receiving a temperature-control agent, which serves for controlling the temperature of the battery cells of the battery module.

From the above-mentioned prior art, it is accordingly known either to cool the battery modules of the motor vehicle battery via the battery housing of the motor vehicle battery, or to undertake the cooling of the battery cells of a battery module via a housing of the battery module. The invention present here relates to the cooling of battery modules of the motor vehicle battery via the battery housing of the motor vehicle battery and not to the cooling of battery cells of the individual battery modules via the housing of individual battery modules.

From the above-cited prior art relating to the cooling of battery modules via the battery housing of a motor vehicle battery, it is known to cool the battery modules from the housing base. Cooling of the battery modules can therefore be ensured to a certain extent, but uniform cooling of the battery modules is not possible. The service life of the battery modules is thereby limited.

SUMMARY OF THE INVENTION

There is a need for a motor vehicle battery with improved cooling of the battery module. According to an example, a motor vehicle battery includes a battery housing. The battery housing includes a housing interior that is bounded by a housing cover or by a housing lid opposite the housing base. At least one second cooling duct for cooling the battery modules from a second side is formed in the region of the housing cover or of the housing lid. In the case of the motor vehicle battery according to aspects of the invention, the battery modules of same can be cooled via the housing base and the housing cover or the housing lid from two opposites sides. Uniform cooling and therefore controlling of the temperature of the battery modules is possible therewith, as a result of which the service life of the battery modules can be increased.

According to an advantageous development, each battery module is thermally coupled both to the housing base and to the housing cover or to the housing lid in order to cool the respective battery module on both sides. Via the thermal coupling of the battery modules on one side to the housing base and on the other side to the housing cover or to the housing lid, particularly advantageous cooling of the battery modules of the motor vehicle battery on both sides is possible. The service life of the battery modules can thereby be increased further.

The battery modules are thermally coupled to the housing base and the housing cover or the housing lid via a heat-conducting medium, which is arranged between the battery modules and the housing base and also the housing cover or the housing lid.

The heat-conducting medium arranged between the housing base and the battery modules and also between the housing cover or the housing lid and the battery modules can compensate for tolerances, unevennesses and the like of the battery housing and can always ensure an optimum thermal contact connection of the battery modules to the housing base and the housing cover or the housing lid in order thereby to further increase the service life of the battery modules.

According to an advantageous development, the housing base has a wall segment facing the battery modules and a wall segment facing away from the battery modules, between which wall segments at least one first cooling duct or multiple first cooling ducts are formed. The battery modules are thermally coupled to that wall segment of the housing base, which faces the battery modules.

The housing cover or the housing lid has a wall segment facing the battery modules and a wall segment facing away from the battery modules, between which wall segments at least one second cooling duct or multiple second cooling ducts are formed. The battery modules are thermally coupled to that wall segment of the housing cover or of the housing lid, which faces the battery modules.

That wall segment of the housing base which faces the battery modules and that wall segment of the housing base which faces away from the battery modules are spaced apart in first sections, in which the at least one first cooling duct or each first cooling duct is formed, and, in second sections, in which no cooling duct is formed, are connected directly or indirectly via a central wall segment.

That wall segment of the housing cover or of the housing lid which faces the battery modules and that wall segment of the housing cover or of the housing lid which faces away from the battery modules are spaced apart in first sections, in which the at least one second cooling duct or each second cooling duct is formed, and, in second sections, in which no cooling duct is formed, are connected directly or indirectly via a central wall segment.

The cooling ducts are bounded by the respective wall segment which faces the battery modules and by the respective wall segment which faces away from the battery modules or by the respective wall segment which faces the battery modules and by the respective central wall segment.

Such a design of the battery housing in the region of the housing base and also of the housing cover or the housing lid is particularly preferred in order to form the cooling ducts which serve for cooling the battery modules on both sides. The cooling ducts, which are formed between the respective wall segment facing the battery modules and the respective wall segment facing away from the battery modules are bounded at least by the respective wall segment facing the battery modules and are oppositely bounded either by the wall segment facing away from the battery modules or by an additional central wall segment. Along with a simple design, this permits optimum cooling of the battery modules on both sides in order to increase the service life of same.

According to an advantageous development, the housing frame has outer longitudinal members and inner longitudinal members and also outer crossmembers and inner crossmembers. The housing base is connected to the outer and inner longitudinal members and to the outer and inner crossmembers of the housing frame.

The housing cover or the housing lid is connected to the outer and inner longitudinal members and to the outer and inner crossmembers of the housing frame.

The housing base and the housing cover or the housing lid are designed as a single shell in edge sections adjacent to the outer crossmembers and longitudinal members. The housing base and the housing cover or the housing lid are designed in multi-shell form in a central section adjacent to the respective edge section. The housing base and the housing cover or the housing lid have deformation beads in the edge sections, in which same are formed as a single shell. A battery housing of this type not only ensures cooling of the battery modules on both sides from the housing base and also from the housing cover or the housing lid, but furthermore also ensures optimum reinforcement of the motor vehicle battery in order to increase the crash safety of the motor vehicle battery. Forces acting on the motor vehicle battery, namely on the battery housing, in the event of a crash can be dissipated via the deformation beads in order to protect the battery modules as such against damage.

According to an advantageous development, meandering cooling ducts and/or cooling ducts in the counterflow principle with a feed line and an opposed return line are formed in the region of the housing base and the housing cover or the housing lid. Cooling ducts of this type permit optimum removal of heat on both sides from the battery modules and thus uniform cooling of same, as a result of which the service life of the battery modules can be increased further.

BRIEF DESCRIPTION OF THE DRAWINGS

Preferred developments of the invention emerge from the dependent claims and the description below. Exemplary embodiments of the invention will be explained in greater detail using the drawing, without being restricted thereto. In the drawing:

DETAILED DESCRIPTION OF THE INVENTION

The invention relates to a motor vehicle battery, designed as a traction battery, of a motor vehicle, as is used in electric vehicles or hybrid vehicles.

Figure 1:
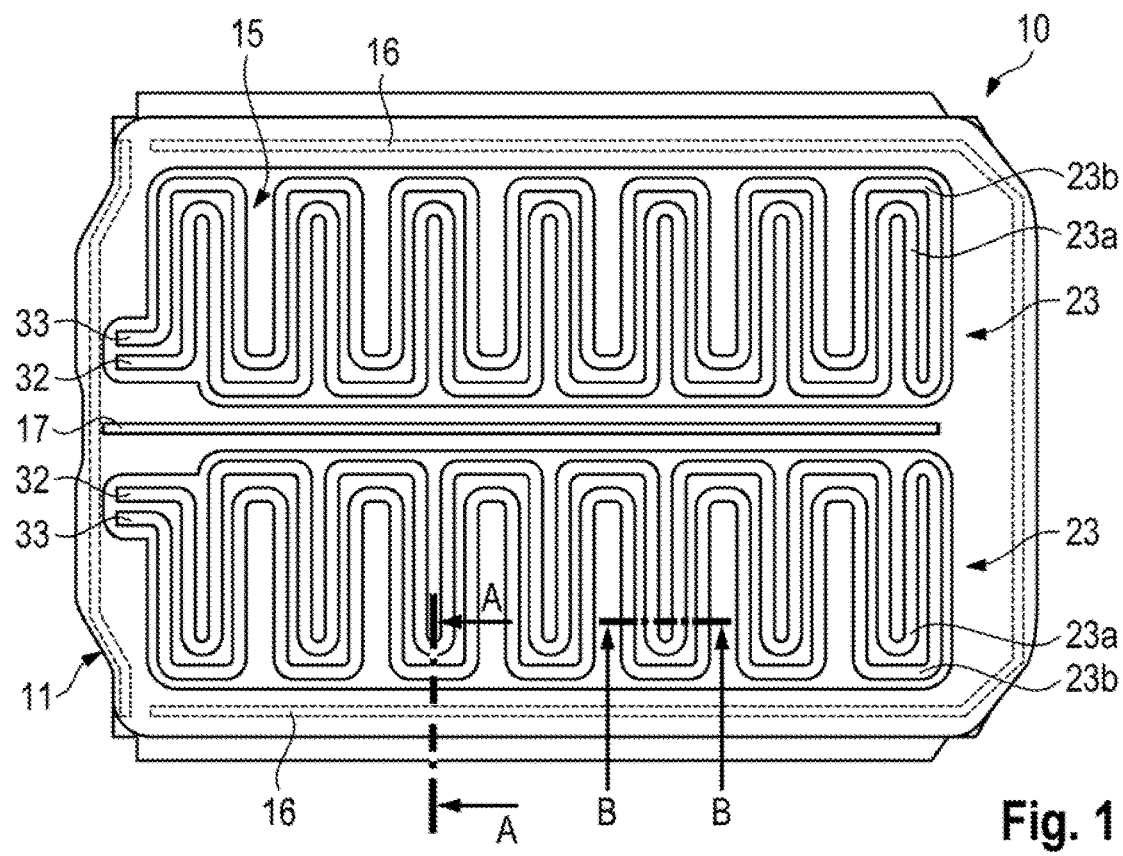
FIG. 1 shows a top view of a motor vehicle battery.
Figure 6:
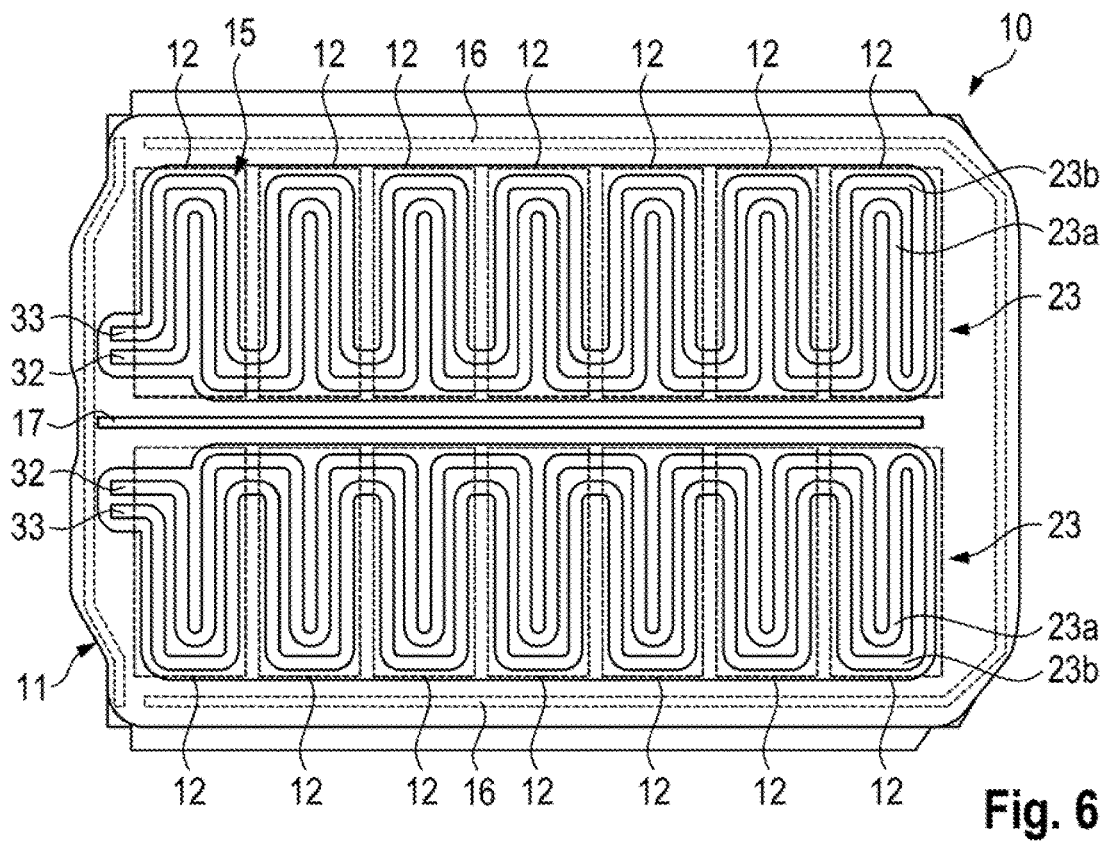
FIG. 6 shows the top view of FIG. 1 with an emphasis on battery modules.
Figure 7:
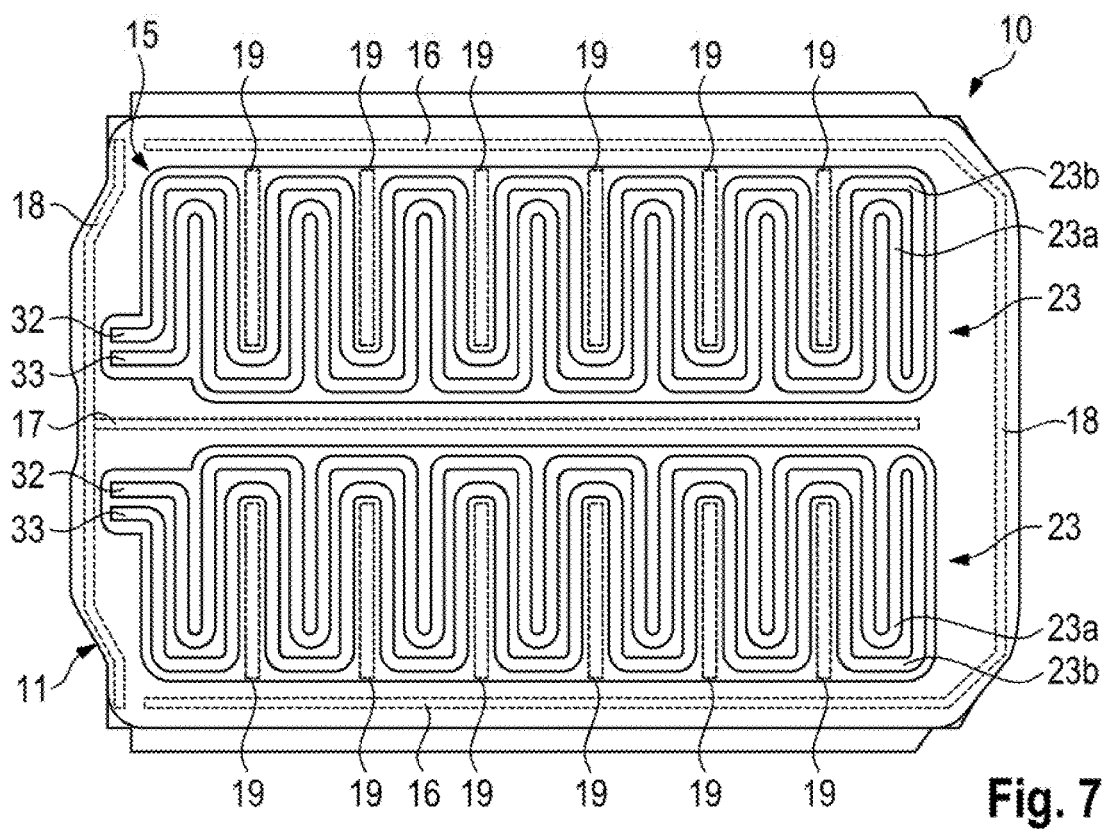
FIG. 7 shows the top view of FIG. 1 with an emphasis on a housing frame.

FIGS. 1, 6 and 7 each show a top view of a motor vehicle battery 10 according to aspects of the invention. Such a motor vehicle battery 10 has a battery housing 11 and also a plurality of battery modules 12 accommodated in the battery housing 11.

Vertical projection areas of the battery modules 12 accommodated by the battery housing 11 are shown in a dashed line guide in FIG. 6.

Each of the battery modules 12 has battery cells (not shown) which are electrically contacted, forming the respective battery module 12.

The battery housing 11 has a housing frame 13, a housing base 14, a housing cover 15 or a housing lid 15. The housing frame 13 has outer longitudinal struts 16 and at least one inner longitudinal strut 17. Furthermore, the housing frame 13 has outer transverse struts 18 and also, in the exemplary embodiment illustrated, has a plurality of inner transverse struts 19. FIG. 7 shows vertical projection areas of the outer and inner longitudinal struts 16, 17 and of the outer and inner transverse struts 18, 19 in a dashed line guide.

The housing frame 13 with its longitudinal struts 16, 17 and its transverse struts 18, 19 extends between the housing base 14 and the housing cover 15 or the housing lid 15. The housing frame 13, the housing base 14 and the housing cover 15 or the housing lid 15 define an interior 20 of the battery housing 11, in which the battery modules 12 are accommodated.

A protective plate 21 extends under the housing base 14 of the battery housing 13 in order to protect the motor vehicle battery 10, which is installed in the region of an underbody of the motor vehicle, against damage, wherein the protective plate 21 is mounted on the housing frame 13 of the battery housing 11.

The battery modules 12 of the motor vehicle battery 10 can be cooled firstly in the region of the housing base 14 via at least one first cooling duct 22, which is formed in the region of the housing base 14, and also secondly in the region of the housing cover 15 or the housing lid 15 via at least one second cooling duct 23, which is formed in the region of the housing cover 15 or of the housing lid 15, in order thus to cool, and therefore uniformly control the temperature of, the battery modules 12 from two opposite sides.

Each battery module 12 can accordingly be cooled, or the temperature thereof can be controlled, firstly from a first, lower side via at least one first cooling duct 22 or each of multiple first cooling ducts 22 of the housing base 14 and secondly from an opposite upper, second side via at least one second cooling duct 23 or each of multiple second cooling ducts 23 of the housing cover 15 or of the housing lid 15.

For this purpose, each battery module 15 is thermally coupled both to the housing base 14 and to the housing cover 15 or the housing lid 15, in the exemplary embodiment shown via a heat-conducting medium 24 which is positioned between the respective battery module 12 and the housing base 14 and also via a heat-conducting medium 24 which is positioned between the respective battery module 12 and the housing lid 15 or the housing cover 15. Tolerances and unevennesses in the structure of the battery housing 11 can be compensated for via the heat-conducting medium 24 or the heat-conducting substance such that an optimum thermal contact connection of the battery modules 12 downward to the housing base 14 and upward to the housing cover 15 or the housing lid 15 is always ensured.

The housing base 14 has a wall segment 14a facing the battery modules 12 and a wall segment 14b facing away from the battery modules 12. The at least one first cooling duct 22 or each first cooling duct 22 is formed between said wall segments 14a, 14b. The battery modules 12 are thermally coupled to that wall segment 14a of the housing base 14 which faces the battery modules 12, in particular via the heat-conducting medium 24 which is positioned between the wall segment 14a facing the battery modules 12 and the battery modules 12.

The housing cover 15 or the housing lid 15 like the housing base 14 has a wall segment 15a facing the battery modules 12 and a wall segment 15b facing away from the battery modules 12. The at least one second cooling duct 23 or each second cooling duct 23 is as formed between these wall segments 15a, 15b of the housing cover 15 or of the housing lid 15. The battery modules 12 are in contact with that wall segment 15a of the housing cover 15 or the housing lid 15 which faces the battery modules 12, in particular via the heat-conducting medium 24 which is positioned between the battery modules 12 and the wall segment 15a facing the battery modules 12.

Figure 4:
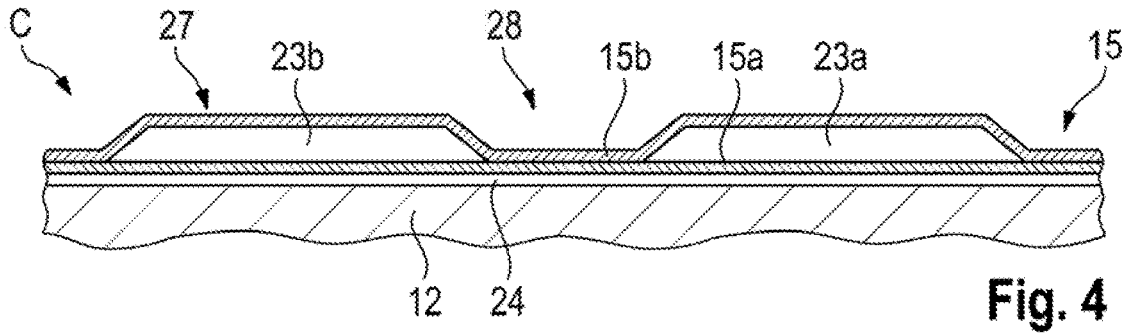
FIG. 4 shows the detail C of FIG. 3.
Figure 5:
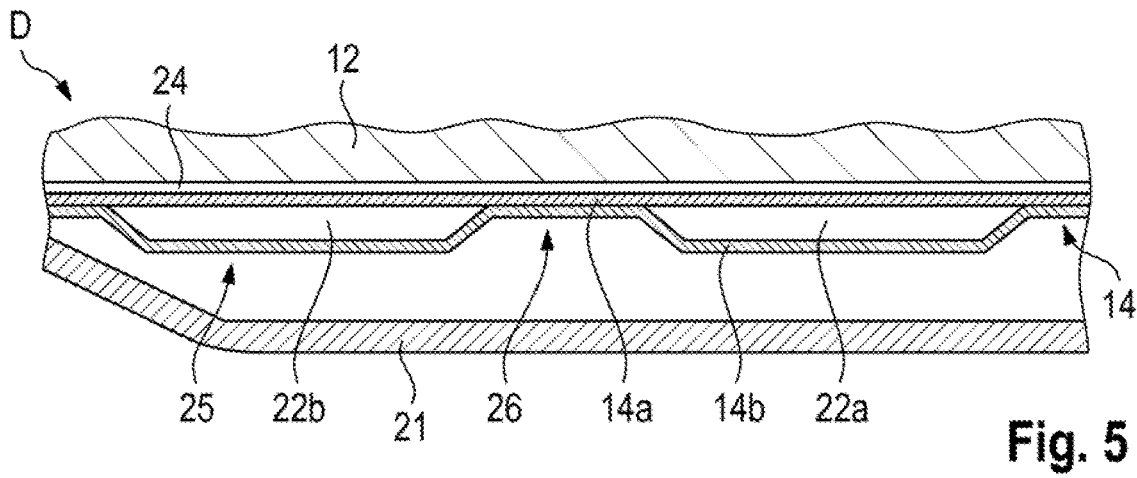
FIG. 5 shows the detail D of FIG. 3.

As can best be gathered from FIGS. 4 and 5, that wall segment 14a of the housing base 14 which faces the battery modules 12 and that wall segment 14b of the housing base 14 which faces away from the battery modules 12 are spaced apart from each other in first sections 25, whereas, in second sections 26, said wall segments 14a, 14b are connected directly to each other in the exemplary embodiment shown. Similarly, in the region of the housing cover 15 or of the housing lid 15, the wall segment 15a facing the battery modules 12 and the wall segment 15b facing away from the battery modules 12 are spaced apart from each other in first sections 27, and, in second sections 28, are connected directly to each other in the exemplary embodiment shown.

The cooling ducts 22, 23 are then formed in the region of the first sections 25, 27 of housing base 14 and housing cover 15 or housing lid 15. In the exemplary embodiment shown, the cooling ducts 22, 23 are bounded in the region of the first sections 25, 27 by the wall segments 14a, 14b or 15a, 15b which are spaced apart from each other.

It is possible that, in contrast to the exemplary embodiment shown, a central wall segment is arranged between the respective wall segment 14a or 15a, which faces the battery modules 12, and the respective wall segment 14b or 15b, which faces away from the battery modules 12, in the region of the housing base 14 and/or in the region of the housing cover 15 or of the housing lid 15, via which central wall segment then, in the region of the second sections 26, 28 of housing base 14 and housing cover 15 or housing lid 15, the wall segments 14a, 14b or 15a, 15b of same are indirectly connected to each other. In this case, the cooling ducts 22, 23 are then bounded by the wall segments 14a, 14b facing the battery modules 12, and also by the central wall segments (not shown).

The connection of the wall segments 14a, 14b or 15a, 15b of housing base 14 and housing cover 15 or housing lid 15 can take place in an integrally bonded and/or force-fitting and/or form-fitting manner, for example by welding, in particular cold pressure welding, soldering, adhesive bonding or the like. The wall segments 14a, 14b and 15a, 15b of housing base 14 and housing cover 15 or housing lid 15 are preferably composed here of a metallic material, such as, for example, a steel sheet or an aluminum sheet.

The longitudinal members 16, 17 and crossmembers 18, 19 of the housing frame 13 are also preferably manufactured from a metallic material, such as, for example, in the form of extruded profiles from steel or aluminum. The connection of the housing base 14 to the housing frame 13 and of the housing cover 15 or housing lid 15 to the housing frame 13 can take place in turn in an integrally bonded and/or force-fitting and/or form-fitting manner, in particular in turn by welding, in particular cold pressure welding, soldering, adhesive bonding or the like.

As already stated, the housing frame 13 comprises the outer longitudinal members 16, the outer crossmembers 18, at least one inner longitudinal member 17 and the inner crossmembers 19. The housing base 14 and the housing lid 15 or the housing cover 15 comprise the wall segments 14a, 15a facing the battery modules 12, and also the wall segments 14b, 15b facing away from the battery modules 12.

Figure 2:
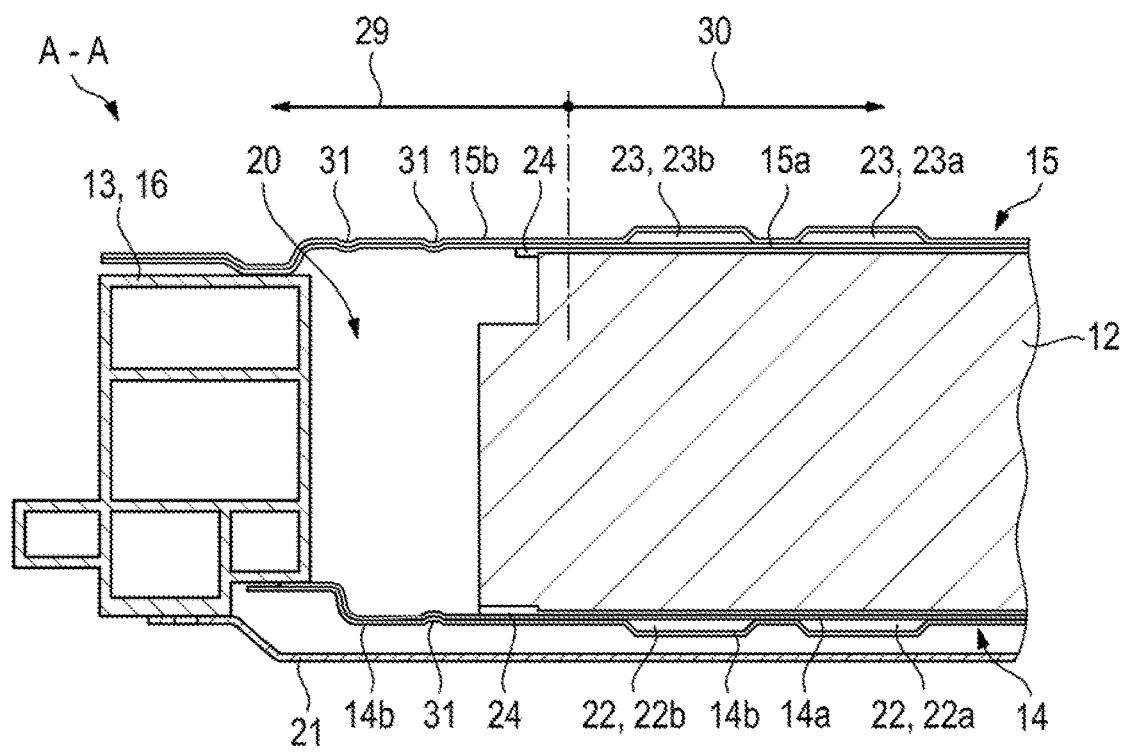
FIG. 2 shows the cross section A-A of FIG. 1.
Figure 3:
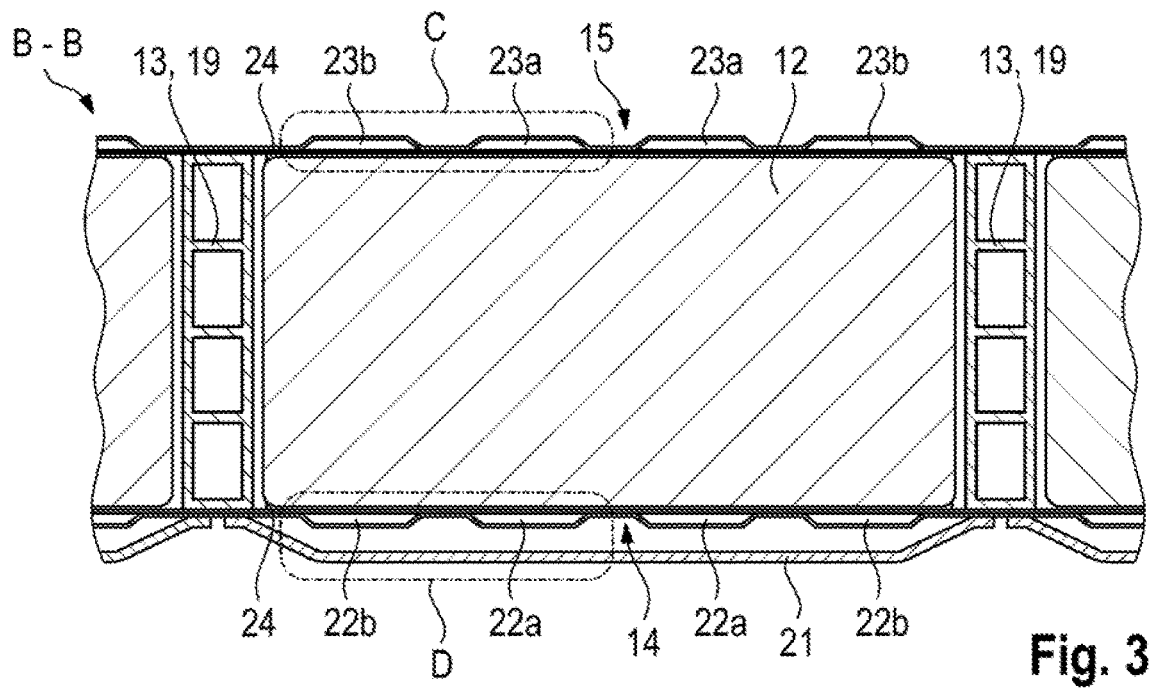
FIG. 3 shows the cross section B-B of FIG. 1.

In a particularly preferred refinement of the invention, it is provided that the housing base 14 and the housing cover 15 or the housing lid 15 are merely of single-shell design in a preferably encircling edge section of same, which is adjacent to the outer crossmembers 18 and the outer longitudinal members 16, wherein a cutout of such an edge section 29 is shown in FIG. 2.

Housing base 14 and housing cover 15 or housing lid 15 are of multi-shell design in a central section 30 adjacent to such a single-shell edge section 29 on the inside.

In the multi-shell central section 30, the wall segments 14a, 15a facing the battery modules 12, and also the wall segments 14b, 15b facing away from the battery modules 12 are present, as is optionally also a central wall segment, which is not shown.

By contrast, in the single-shell edge section 29, only one of said wall segments is present, in the exemplary embodiment shown the wall segment 14a, 15a which faces the battery modules 12 and is extended from the multi-shell central section 30 into the single-shell edge region 29.

The cooling ducts 22, 23 which have already been mentioned are formed where the housing base 14 and the housing cover 15 or the housing lid 15 are of multi-shell design. The cooling ducts 22, 23 are formed here where, in the vertical projection, the housing base 14 and the housing cover 15 or the housing lid 15 cover the battery module 12.

In order to form said cooling ducts 22, 23, in the first sections 25, 27 the wall segments 14a, 15a facing the battery modules 12 and the wall segments 14b, 15b facing away from the battery modules are spaced apart from housing base 14 and housing cover 15 or housing lid 15 with the formation of intermediate spaces or cavities. Furthermore, in these regions in which the housing base 14 and the housing lid 15 or the housing cover 15 cover the battery modules 12 in vertical projection, the cooling ducts 22, 23 are separated or spaced apart from one another via the second sections 26, 28. Where, in the vertical projection, the housing base 14 and the housing cover 15 or the housing lid 15 cover the inner transverse struts 19 and the inner longitudinal struts 17, only the second sections 26, 28 of the multi-shell housing base 14 or of the multi-shell housing cover 15 or the multi-shell housing lid 15 are formed, i.e. no cooling ducts, as a result of which optimum connection of housing base 14 and housing cover 15 or housing lid 15 to the inner longitudinal member 17 or the inner crossmembers 19 is ensured.

The housing base 14 and the housing cover 15 or the housing led 15 is of single-shell design in the respective edge section 29, in which the housing base 14 and the housing cover 15 or the housing lid 15 engage on the outer longitudinal members 16 and the outer crossmembers 18.

In this edge section 29, the housing base 14 and the housing cover 15 or the housing lid 15 are connected in an encircling manner to the housing frame 13, namely to the outer longitudinal members 16 and outer crossmembers 18.

The housing base 14 and the housing cover 15 or the housing lid 15 are furthermore connected to the housing frame 13 in the region of the inner members 17, 19. This permits optimum reinforcement of the motor vehicle battery and also optimum cooling of the battery modules 12 since the penetration of air between the battery modules 12 and the housing base 14 and also the housing cover 15 or the housing lid 15 is prevented and optimum thermal coupling of the battery modules 12 to the housing base 14 and to the housing cover 15 or the housing lid 15 is made possible.

In these connecting regions which, as already mentioned, can be formed in an integrally bonded and/or form-fitting and/or force-fitting manner, a seal can additionally be provided. A sealing element is preferably arranged here between that respective wall segment 14a, 15a of housing base 14 or housing cover 15 that faces the battery modules 12 and the respective member 16, 17, 18, 19 of the housing frame 13.

Deformation beads 31 are preferably formed in the edge section 29. By means of the deformation beads 31, forces acting on the battery housing 11 in the event of a crash can be dissipated by targeted deformation in the region of the deformation beads 31, in order to avoid damage to the battery modules 12.

Forces in the event of a crash can be absorbed in the respective edge section 29, in which housing base 14 and housing cover 15 or housing lid 15 are preferably of single-shell design and in which no cooling of the battery modules 12 is required.

By contrast, in the central section 30, in which the battery modules 12 have to be cooled and in which there is a greater rigidity requirement, there is no risk of damage to the cooling ducts 22, 23 and to the battery modules 12.

As can best be gathered from FIGS. 1, 6 and 7, which each show a top view of a motor vehicle battery 10 and accordingly of housing lid 15 or housing cover 15, in the exemplary embodiment shown two meandering cooling ducts 23 which are each designed in the counterflow principle, specifically with a feed line 23a and an opposed return line 23b, are formed in the region of the housing cover 15 or housing lid 15.

An inlet connection 32 for the feed line 23a of the respective cooling duct 23 and an outlet connection 33 for the return line 23b of the respective cooling duct 23 are formed here on a common transverse side of the battery housing 11 of the motor vehicle battery 10.

The respective cooling duct 23 extends from said transverse side, on which the inlet connection 32 and the outlet connection 33 are formed, in the longitudinal direction of the motor vehicle battery 10 toward the opposite transverse side of same.

Inlet connection 32 and the outlet connection 33 can be formed on that wall segment 14a, 15a of housing base 14 and housing cover 15 or housing lid 15 which faces the battery modules 12 or on that wall segment 14b, 15b of housing base 14 and housing cover 15 or housing lid 15 which faces away from the battery modules 12.

The respective cooling duct 23 extends over a plurality of battery modules 12, which are arranged consecutively in the longitudinal direction, forming the meandering interlacing of feed line 23a and return line 23b.

The feed line 23a extends here on the inside with respect to the inner longitudinal member 17 in an inner region of the motor vehicle battery. The respective return line 23b extends on the outside. Accordingly, the feed line 23a runs in the inner region in which the battery modules 12 are at the highest temperature. The return line 23b extends on the outside over colder sections of the battery modules 12. By this means, heat can be homogeneously removed from the battery modules 12 with lower temperature spreading in the battery modules 12.

The contouring of the cooling ducts 23 shown for the housing cover 15 or the housing lid 15 in FIGS. 1, 6 and 7 is also present in the region of the housing base 14. By this means, optimum cooling of the battery modules 12 on both sides is possible.

The inlet connection 32 and the outlet connection 33 of the respective cooling duct 23 each preferably extend perpendicularly to the housing cover 15 or to the housing lid 15, wherein corresponding connections are also present in the region of the housing base 14.

The invention permits optimum cooling of a motor vehicle battery 10, which is designed as a traction battery, namely cooling on both sides and simultaneously of a plurality of battery modules 12 of the motor vehicle battery 10 via the housing base 14 and the housing cover 15 or the housing lid 15 of the battery housing 11. By this means, the service life of the battery modules 12 can be increased. Furthermore, in a particularly preferred embodiment, the crash safety for the motor vehicle battery 10 can be increased.

What is claimed is:

1. A motor vehicle battery comprising:
    a battery housing which has a housing interior bounded in sections by a housing frame and a housing base;
    a plurality of battery modules arranged in the housing interior; and
    at least one first cooling duct, which is formed in a first region of the housing base, for cooling the battery modules from a first side,
    wherein:
        the housing interior is bounded by a housing cover or by a housing lid opposite the housing base,
        at least one second cooling duct for cooling the battery modules from a second side is formed in a second region of the housing cover or of the housing lid,
        the housing frame has outer longitudinal members and at least one inner longitudinal member and also outer crossmembers and inner crossmembers,
        the housing base and the housing cover or the housing lid are each connected to the outer and inner longitudinal members and to the outer and inner crossmembers of the housing frame, the housing base and the housing cover or the housing lid are designed as a single shell in an edge section adjacent to the outer crossmembers and longitudinal members, and the housing base and the housing cover or the housing lid are designed in a multi-shell form in a central section adjacent to the edge section.

2. The motor vehicle battery of claim 1, wherein each battery module is thermally coupled both to the housing base and to the housing cover or to the housing lid in order to cool each battery module on both sides.

3. The motor vehicle battery of claim 1, wherein:

the housing base has a first wall segment facing the battery modules and a second wall segment facing away from the battery modules, the at least one first cooling duct being formed between the first and second wall segments, the battery modules are thermally coupled to the first wall segment of the housing base which faces the battery modules, the housing cover or the housing lid has a third wall segment facing the battery modules and a fourth wall segment facing away from the battery modules, the at least one second cooling duct being formed between the third and fourth wall segments, and the battery modules are thermally coupled to that the third wall segment of the housing cover or of the housing lid which faces the battery modules.

4. The motor vehicle battery of claim 3, wherein:

the first wall segment of the housing base which faces the battery modules and the second wall segment of the housing base which faces away from the battery modules are spaced apart in first sections, in which the at least one first cooling duct is formed, and, in second sections, in which no cooling duct is formed, are connected directly or indirectly via a first central wall segment, the third wall segment of the housing cover or of the housing lid which faces the battery modules and the fourth wall segment of the housing cover or of the housing lid which faces away from the battery modules are spaced apart in first sections, in which the at least one second cooling duct is formed, and, in second sections, in which no cooling duct is formed, are connected directly or indirectly via a second central wall segment, the first and second cooling ducts are bounded by a respective one of the first or third wall segment which faces the battery modules and by a respective one of the second or fourth wall segment which faces away from the battery modules, or by the respective one of the first or third wall segment which faces the battery modules and by a respective one of the first or second central wall segment.

5. The motor vehicle battery of claim 1, wherein the battery modules are thermally coupled to the housing base and the housing cover or the housing lid via a heat-conducting medium which is arranged between the battery modules and the housing base and also the housing cover or the housing lid.

6. The motor vehicle battery of claim 1, wherein:

the housing base and the housing cover or the housing lid, in the single-shell edge section, exclusively have a first wall segment facing the battery modules or a second wall segment facing away from the battery modules or a first central wall segment, and the housing base and the housing cover or the housing lid, in the multi-shell central section, have both a third wall segment facing the battery modules and a fourth wall segment facing away from the battery modules, or a second central wall segment.

7. The motor vehicle battery of claim 1, wherein:

first sections of the multi-shell central section of housing base and housing cover or housing lid, in which a first wall segment of housing base and the housing cover or the housing lid which faces the battery modules and a second wall segment of housing base and housing cover or housing lid which faces away from the battery modules are spaced apart and in which the first and second cooling ducts are formed, are formed or positioned in a first vertical projection of the battery modules, and second sections of the multi-shell central section of housing base and housing cover or housing lid, in which a third wall segment of the housing base and the housing cover or the housing lid which faces the battery modules and a fourth wall segment of the housing base and the housing cover or the housing lid which faces away from the battery modules are directly or indirectly connected and in which no first and second cooling ducts are formed, are formed or positioned in a second vertical projection of the inner crossmembers and longitudinal members and between the first sections.

8. The motor vehicle battery of claim 1, wherein the housing base and the housing cover or the housing lid have deformation beads in the single-shell edge section, in which same are formed as the single shell.

9. The motor vehicle battery of claim 1, wherein the first and second cooling ducts are of a meandering design.

10. The motor vehicle battery of claim 1, wherein the first and second cooling ducts are designed in a counterflow principle with a feed line and an opposite return line.

* * * * *

UNITED STATES PATENT AND TRADEMARK OFFICE
CERTIFICATE OF CORRECTION

PATENT NO. : 10,741,893 B2  
APPLICATION NO. : 16/170227  
DATED : August 11, 2020  
INVENTOR(S) : Philipp Kellner Page 1 of 1

It is certified that error appears in the above-identified patent and that said Letters Patent is hereby corrected as shown below:

Column 9:  
In Claim 3, Line 27, "coupled to that the third" should read --coupled to the third--.  
In Claim 4, Line 35, "and, in" should read --and in--.  
In Claim 4, Line 44, "and, in" should read --and in--.

Column 10:  
In Claim 7, Lines 21-22, "housing base and housing cover or housing lid" should read --the housing base and the housing cover or the housing lid--.  
In Claim 7, Line 23, "wall segment of housing base" should read --wall segment of the housing base--.  
In Claim 7, Lines 25-26, "housing base and housing cover or housing lid" should read --the housing base and the housing cover or the housing lid--.  
In Claim 7, Lines 31-32, "housing base and housing cover or housing lid" should read --the housing base and the housing cover or the housing lid--.

Signed and Sealed this  
Thirteenth Day of October, 2020

Andrei Iancu  
*Director of the United States Patent and Trademark Office*